(12) United States Patent
Rao et al.

(10) Patent No.: US 11,205,077 B1
(45) Date of Patent: Dec. 21, 2021

(54) OPERATING ON A VIDEO FRAME TO GENERATE A FEATURE MAP OF A NEURAL NETWORK

(71) Applicant: Arm Limited, Cambridge (GB)

(72) Inventors: Jayavarapu Srinivasa Rao, Cambridge (GB); Daren Croxford, Cambridge (GB); Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 91 days.

(21) Appl. No.: 16/888,068

(22) Filed: May 29, 2020

(51) Int. Cl.
*G06K 9/62* (2006.01)
*G06N 3/08* (2006.01)
*G06N 3/04* (2006.01)
*G06K 9/00* (2006.01)

(52) U.S. Cl.
CPC ....... *G06K 9/00744* (2013.01); *G06K 9/6232* (2013.01); *G06K 9/6256* (2013.01); *G06N 3/04* (2013.01); *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,825,140 B1* | 11/2020 | Yang | ...................... | G06N 3/084 |
| 2006/0251330 A1* | 11/2006 | Toth | ...................... | H04N 19/96 |
| | | | | 382/236 |
| 2006/0268980 A1* | 11/2006 | Le Dinh | ............... | H04N 19/154 |
| | | | | 375/240.01 |
| 2008/0050026 A1* | 2/2008 | Bashyam | ............. | H04N 19/124 |
| | | | | 382/238 |
| 2014/0347263 A1* | 11/2014 | Dai | ......................... | G06F 3/017 |
| | | | | 345/156 |
| 2017/0169115 A1* | 6/2017 | Shen | ...................... | G06F 16/243 |
| 2017/0347061 A1* | 11/2017 | Wang | ..................... | G06N 3/049 |
| 2018/0309991 A1* | 10/2018 | Thiagarajan | ......... | H04N 19/126 |
| 2019/0158813 A1* | 5/2019 | Rowell | ................ | H04N 13/189 |
| 2019/0261016 A1* | 8/2019 | Liu | ....................... | H04N 19/176 |

(Continued)

OTHER PUBLICATIONS

Congqi Cao,"Egocentric Gesture Recognition Using Recurrent 3D Convolutional Neural Networks with Spatiotemporal Transformer Modules", Oct. 2017, Proceedings of the IEEE International Conference on Computer Vision (ICCV), 2017,pp. 3763-3769.*

(Continued)

*Primary Examiner* — Omar S Ismail
(74) *Attorney, Agent, or Firm* — EIP US LLP (57) ABSTRACT

A method is described for operating on a frame of a video to generate a feature map of a neural network. The method determines if a block of the frame is an inter block or an intra block, and performs an inter block process in the event that the block is an inter block and/or an intra block process in the event that the block is an intra block. The inter block process determines a measure of differences between the block of the frame and a reference block of a reference frame of the video, and performs either a first process or a second process based on the measure to generate a segment of the feature map. The intra block process determines a measure of flatness of the block of the frame, and performs either a third process or a fourth process based on the measure to generate a segment of the feature map.

18 Claims, 7 Drawing Sheets

(56) References Cited

U.S. PATENT DOCUMENTS

| | | | |
|---|---|---|---|
| 2019/0273948 A1* | 9/2019 | Yin | H04N 19/70 |
| 2020/0184603 A1* | 6/2020 | Mukherjee | G06T 3/40 |
| 2021/0097646 A1* | 4/2021 | Choi | G06N 3/0454 |
| 2021/0287341 A1* | 9/2021 | Birkbeck | G06T 5/002 |

OTHER PUBLICATIONS

Lurng-Kuo Liu, "A Block-Based Gradient Descent Search Algorithm for Block Motion Estimation in Video Coding", Apr. 8, 1996, IEEE Transactions on Circuits and Systems for Video Technology, vol. 6, No. 4, pp. 419-421.*

Srimat Chakradhar, "A Dynamically Configurable Coprocessor for Convolutional Neural Networks", Jun. 2010, ISCA '10: Proceedings of the 37th annual international symposium on Computer architecture, pp. 247-255.*

Siwei Ma, "Image and Video Compression With Neural Networks: A Review", Jun. 2020, IEEE Transactions on Circuits and Systems for Video Technology, vol. 30, No. 6, pp. 1683-1694.*

Youwei Yuan, "A Fast Adaptive Block-matching motion Estimation Algorithm", Sep. 4, 2014, International Journal of Multimedia and Ubiquitous Engineering, vol. 9, No. 4 (2014), pp. 94-99.*

T. Wiegand et al., "Motion Estimation for Video Coding—EE398A Image and Video Compression".

Tosun, Ali Saman, "Video Compression: MPEG-4 and Beyond", Nov. 23, 1999.

Wikipedia, "Video compression picture types", Mar. 31, 2020, https://en.wikipedia.org/w/index.php?title=Video_compression_picture_types&oldid=916270429.

* cited by examiner

OPERATING ON A VIDEO FRAME TO GENERATE A FEATURE MAP OF A NEURAL NETWORK

BACKGROUND OF THE INVENTION

Field of the Invention

The present invention relates to a method of operating on a frame of a video to generate a feature map of a neural network, and to a processing unit and system for implementing the method.

Description of the Related Technology

Machine learning may be used to process visual data, such as video. For example, machine learning may be used to extract meaningful information form the visual data (e.g. the identify and location of objects), or to enhance or manipulate the visual data (e.g. increase the resolution or dynamic range). It may be desirable to implement machine learning locally on an embedded device, e.g. due to concerns over latency or privacy. However, machine learning algorithms can be computationally expensive and may present challenges when trying to implement on an embedded device, particularly in battery-powered products having a low energy or power budget.

SUMMARY

According to a first aspect of the present disclosure, there is provided a method comprising operating on a frame of a video to generate a feature map of a neural network, wherein the frame comprises a plurality of blocks and operating on the frame comprises: determining if a block of the frame is an inter block or an intra block; and performing an inter block process in the event that the block is an inter block and/or an intra block process in the event that the block is an intra block, wherein the inter block process comprises: determining a measure of differences between the block of the frame and a reference block of a reference frame of the video; and performing one of a first process and a second process based on the measure of differences, wherein: the first process comprises performing at least one operation of the neural network on the block of the frame to generate a segment of the feature map; and the second process comprises using a segment of a reference feature map to generate the segment of the feature map; and wherein the intra block process comprises: determining a measure of flatness of the block; and performing one of the third process and a fourth process based on the measure of flatness, wherein: the third process comprises performing at least one operation of the neural network on the block to generate a segment of the feature map; and the fourth process comprises performing an inverse frequency transform on a DC coefficient of the block to generate a DC offset, and using the DC offset to generate each element of the segment of the feature map.

According to a second aspect of the present disclosure, there is provided a processing unit configured to: determine if a block of a frame of a video is an inter block or an intra block; and perform an inter block process in the event that the block is an inter block and/or an intra block process in the event that the block is an intra block, wherein the inter block process comprises: determining a measure of differences between the block of the frame and a reference block of a reference frame of the video; and performing one of a first process and a second process based on the measure of differences, wherein: the first process comprises performing or instructing a further processing unit to perform at least one operation of a neural network on the block of the frame to generate a segment of the feature map; and the second process comprises using a segment of a reference feature map to generate the segment of the feature map; and wherein the intra block process comprises: determining a measure of flatness of the block; and performing one of the third process and a fourth process based on the measure of flatness, wherein: the third process comprises performing or instructing a further processing unit to perform at least one operation of a neural network on the block to generate a segment of the feature map; and the fourth process comprises performing an inverse frequency transform on a DC coefficient of the block to generate a DC offset, and using the DC offset to generate each element of the segment of the feature map.

According to a third aspect of the present disclosure, there is provided a system comprising a first processing unit and a second processing unit, wherein the first processing unit is configured to: operate on a frame of a video to generate a feature map of a neural network, wherein the frame comprises a plurality of blocks and operating on the frame comprises: determining if a block of a frame of a video is an inter block or an intra block; and performing an inter block process in the event that the block is an inter block and/or an intra block process in the event that the block is an intra block, wherein the inter block process comprises: determining a measure of differences between the block of the frame and a reference block of a reference frame of the video; and performing one of a first process and a second process based on the measure of differences, wherein: the first process comprises instructing the second processing unit to perform at least one operation of the neural network on the block of the frame to generate a segment of the feature map; and the second process comprises using a segment of a reference feature map to generate the segment of the feature map; and wherein the intra block process comprises: determining a measure of flatness of the block; and performing one of the third process and a fourth process based on the measure of flatness, wherein: the third process comprises performing or instructing the second processing unit to perform at least one operation of the neural network on the block to generate a segment of the feature map; and the fourth process comprises performing an inverse frequency transform on a DC coefficient of the block to generate a DC offset, and using the DC offset to generate each element of the segment of the feature map.

According to a fourth aspect of the present disclosure, there is provided a method comprising operating on a frame of a video to generate a feature map of a neural network, wherein the frame comprises a plurality of blocks and operating on the frame comprises: determining a measure of differences between the block of the frame and a reference block of a reference frame of the video; and performing one of a first process and a second process based on the measure, wherein: the first process comprises performing at least one operation of the neural network on the block of the frame to generate a segment of the feature map; and the second process comprises using a segment of a reference feature map to generate the segment of the feature map.

According to a fifth aspect of the present disclosure, there is provided a method comprising operating on a frame of a video to generate a feature map of a neural network, wherein the frame comprises a plurality of blocks and operating on the frame comprises: determining a measure of flatness of the block; and performing one of the first process and a second process based on the measure, wherein: the first process comprises performing at least one operation of the neural network on the block to generate a segment of the feature map; and the second process comprises performing an inverse frequency transform on a DC coefficient of the block to generate a DC offset, and using the DC offset to generate each element of the segment of the feature map.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Machine learning may be used to extract information from video (e.g. the identity and location of objects, features, or activities) or to enhance or manipulate video (e.g. increase the resolution or dynamic range). A machine learning system may employ a neural network, such as a convolutional neural network, in order to extract information from each frame of the video. However, processing each frame in this way can be computationally expensive.

Figure 1:
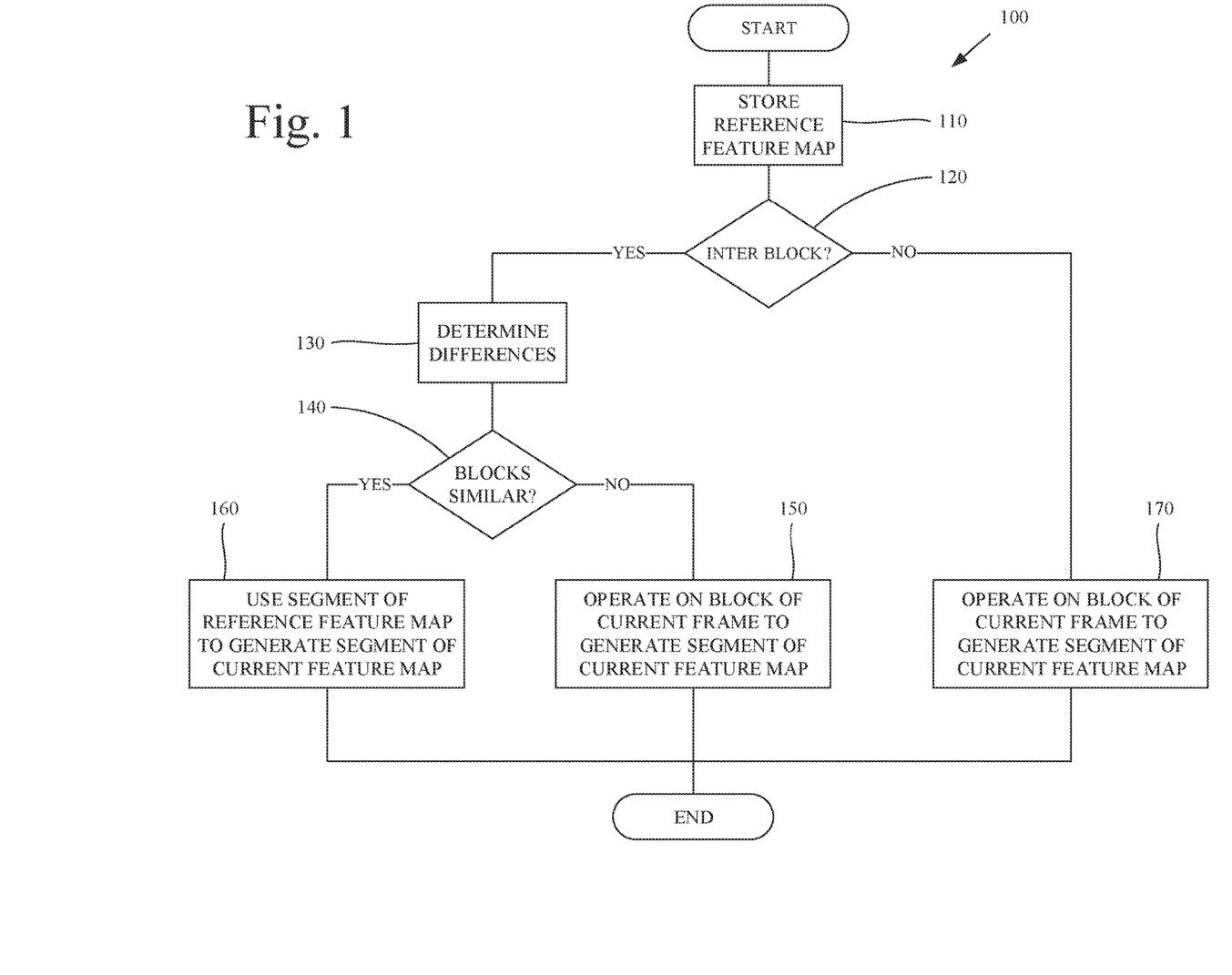
FIG. 1 is a flow chart of an example method for performing operations of a neural network on a video frame.

FIG. 1 is a flow chart of an example method for performing operations of a neural network on a frame of a video.

The method 100 comprises storing 110 a reference feature map. The reference feature map is generated by at least one operation of a neural network performed on a reference frame of a video. The reference feature map may be generated using the methods described herein. Alternatively, the reference feature map may be generated by performing the neural network operation(s) on the reference frame in a conventional manner.

Figure 2:
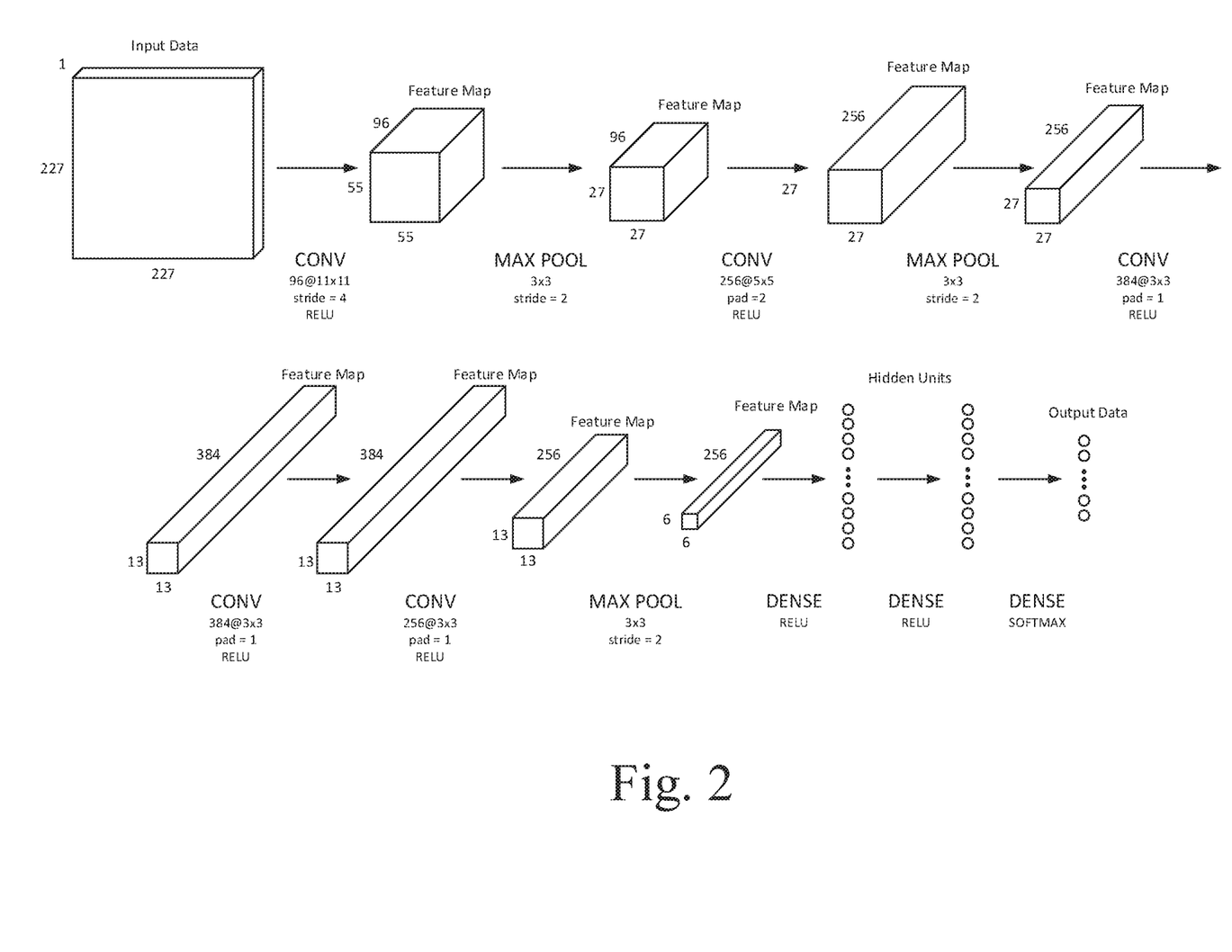
FIG. 2 illustrates an example of a neural network.

FIG. 2 illustrates an example of a neural network. The input data corresponds to a single frame of the video. The input data comprises just one channel corresponding to the luma channel of the frame. However, the input data might additionally comprise channels corresponding to one or both of the chroma channels. Moreover, the input data may comprise channels of an alternative color space, such as RGB.

The first operation of the neural network of FIG. 2 is a convolution. Consequently, the reference feature map may comprise the feature map output by the convolution operation. Storing the feature map output by the convolution operation has the benefit that linear terms may be added to the reference feature map in order to generate a modified feature map, as described below in more detail. The convolution operation is followed by an activation operation and a pooling operation. Accordingly, the reference feature map might alternatively comprise the feature map output by the activation or pooling operation. Storing the feature map output by the pooling operation has the benefit that reference feature map is smaller and thus requires less memory. In FIG. 2, each convolution operation is shown as comprising an activation function (ReLU). However, the convolution operation (which is a linear) and the activation operation (which is typically a non-linear) should be regarded as two separate operations.

The method comprises operating on a current frame of the video to generate a current feature map. Each frame of the video comprises a plurality of blocks. For example, each frame may comprise a plurality of macroblocks, and each macroblock may comprise one or more blocks. For each block of the current frame, the method determines 120 whether the block is an inter block or an intra block. In the event that the block is an inter block, the method performs an inter block process, and in the event that the block is an intra block, the method performs an intra block process.

The inter block process determines 130 a measure of the differences between pixels of the block of the current frame and pixels of the corresponding reference block of the reference frame. This may comprise performing an inverse frequency transform on the block of the current frame (in addition to any decoding and dequantization) in order to convert the coefficients from the frequency domain (frequency coefficients) to the spatial domain (residual coefficients), and then determining a measure of the differences based on the residual coefficients. However, many video transforms, including discrete cosine transform, are orthogonal and so preserve energy content. As a result, a measure of the differences in the pixels of the two blocks may be determined without the need to perform an inverse frequency transform. In particular, a measure of the differences may be determined from the frequency coefficients (quantized or dequantized) of the block of the current frame.

The measure of differences may comprise the sum of squares of the coefficients (be they frequency coefficients or residual coefficients) of the block of the current frame. Alternatively, the measure of differences may comprise the sum of absolute values of the coefficients or any other statistical measure that may be used to determine the magnitude of the residuals. Moreover, the measure of differences may comprise more than one determiner. For example, the measure may comprise the sum of squares of the coefficients and the maximum absolute value of the coefficients. A macroblock may include a skip flag, which when set implies that the residual coefficients for the block are zero. Accordingly, the measure may also comprise the value or setting of the skip flag.

The inter block process determines 140 whether the two blocks (i.e. the block of the current frame and the reference block of the reference frame) are similar based on the measure of differences. For example, the process may determine that the blocks are similar in the event that the skip flag is set. Additionally, or alternatively, the process may compare the measure against a threshold. The blocks are then determined to be similar if the measure is less than the threshold, and dissimilar if the measure is greater than the threshold. As noted above, the measure may comprise more than one determiner. So, for example, the measure may comprise the sum of squares of the coefficients and the maximum absolute value of the coefficients. In this instance, the method may determine that the two blocks are similar if the sum of the squares is less than a threshold, and the maximum value is less than a further threshold.

The inter block process performs one of two operations based on the measure of differences. In particular, the inter block process performs a first process if the blocks are determined to be dissimilar, and a second process if the blocks are determined to be similar.

The first process comprises performing 150 the operation of the neural network on the block of the current frame to generate a portion or segment of the current feature map. The operation is performed on the pixel data of the block. Accordingly, the pixel data of the current block are first reconstructed from the coefficients of the block. So, for example, the frequency coefficients of the block may be decoded, dequantized, and inverse transformed in order to obtain the residual coefficients, and then the residual coefficients may be added to the pixel data of the reference block in order to obtain the pixel data of the current block. The operation of the neural network is the same (at least one) operation that was used to generate the reference feature map. So, for example, if the first convolution operation of FIG. 2 was used to generate the reference feature map, the first process comprises operating on the pixel data of the current block using the first convolution operation to generate a segment of the current feature map.

The width and height of the segment of the current feature map are defined by the size of the current block, as well as the receptive field, stride length and padding of the filter used by the operation. So, for example, if the size of the block is 64×64 and the receptive field, the stride length, and the padding of the filter are 4×4 and (1,1) and zero then the segment size might be 58×58.

The second process comprises using 160 a segment of the reference feature map to generate the segment of the current feature map. The reference segment comprises all channels of the reference feature map, i.e. the depth of the reference segment is the same as that of the reference feature map. However, the width and height of the reference segment are again defined by the size of the current block, as well as the receptive field and stride length of the filter used by the operation.

The block of the current frame may comprise a motion vector, and the second process may comprise using this motion vector in order to identify and/or generate the reference segment. The motion vector may be fractional (e.g. 1.5 pixels up and 2.25 pixels left). As a result, the reference segment may be at a fractionally translated position within the reference feature map. The second process may therefore use interpolation, such as linear interpolation, in order to generate the reference segment. Additionally or alternatively, the reference feature map may have a different width and/or height to that of the reference frame. This can be seen in the neural network of FIG. 2, in which the width and height of the input data is 227×227, whereas the width and height of the feature map of the first convolution operation is 55×55. Any differences in the sizes of the frame and the feature map will result in corresponding changes or scaling of the motion vector. So, for example, if the reference feature map were half the size of the reference frame then a motion vector of (3, 5) would become (1.5, 2.5). Again, interpolation may be used in order to generate the segment of the reference feature map.

The segment of the reference feature map may be used as the segment of the current feature map. That is to say that the reference segment may be used in the current feature map without any modification. Alternatively, as described below in more detail, the reference segment may instead be modified, and the modified reference segment may be used as the segment of the current feature map. In both instances, the reference segment is used (be it unmodified or modified) to generate the segment of the current feature map.

The intra block process comprises performing 170 the operation of the neural network on the block of the current frame to generate a segment of the current feature map. Again, as with the inter block that is deemed dissimilar, the operation is performed on the pixel data of the block.

The method may be repeated for each block of the current frame in order to generate a full feature map composed of a plurality of segments. As noted above, each segment of the current feature map is likely to be smaller than the respective block. As a result, there will be gaps or missing data in the current feature map around each segment. There are various ways in which this might be addressed. For example, the neural network operation may be performed on those portions of the pixel data of the current frame necessary to generate the missing data of the feature map. If the current block is an inter block and has the same motion vector as that of neighboring blocks, then the reference segment as a whole may be used as the segment of the current feature map. Equally, if the current block is an intra block and has the same DC coefficient as that of neighboring blocks which are also deemed flat, then the reference segment as a whole may be used as the segment of the current feature map. As a further example, the video may be encoded using non-standard encoding such that the blocks within each frame overlap. Moreover, the degree of overlap may be defined such that there are no gaps or missing data between segments of the current feature map.

The current feature map, once complete, may be stored and used as the reference feature map for the next frame of the video.

With the method described above, the feature map for the current frame may be generated using segments from the previously-generated reference feature map. As a result, the current feature map may be generated in a computational simpler manner. In particular, the current feature map may be generated without having to perform the neural network operation on each and every block of the current frame. Indeed, for video that changes relatively little from frame to frame, such as that captured by a security camera or by a camera of an augmented reality headset, significant savings in computation may be achieved.

Figure 3:
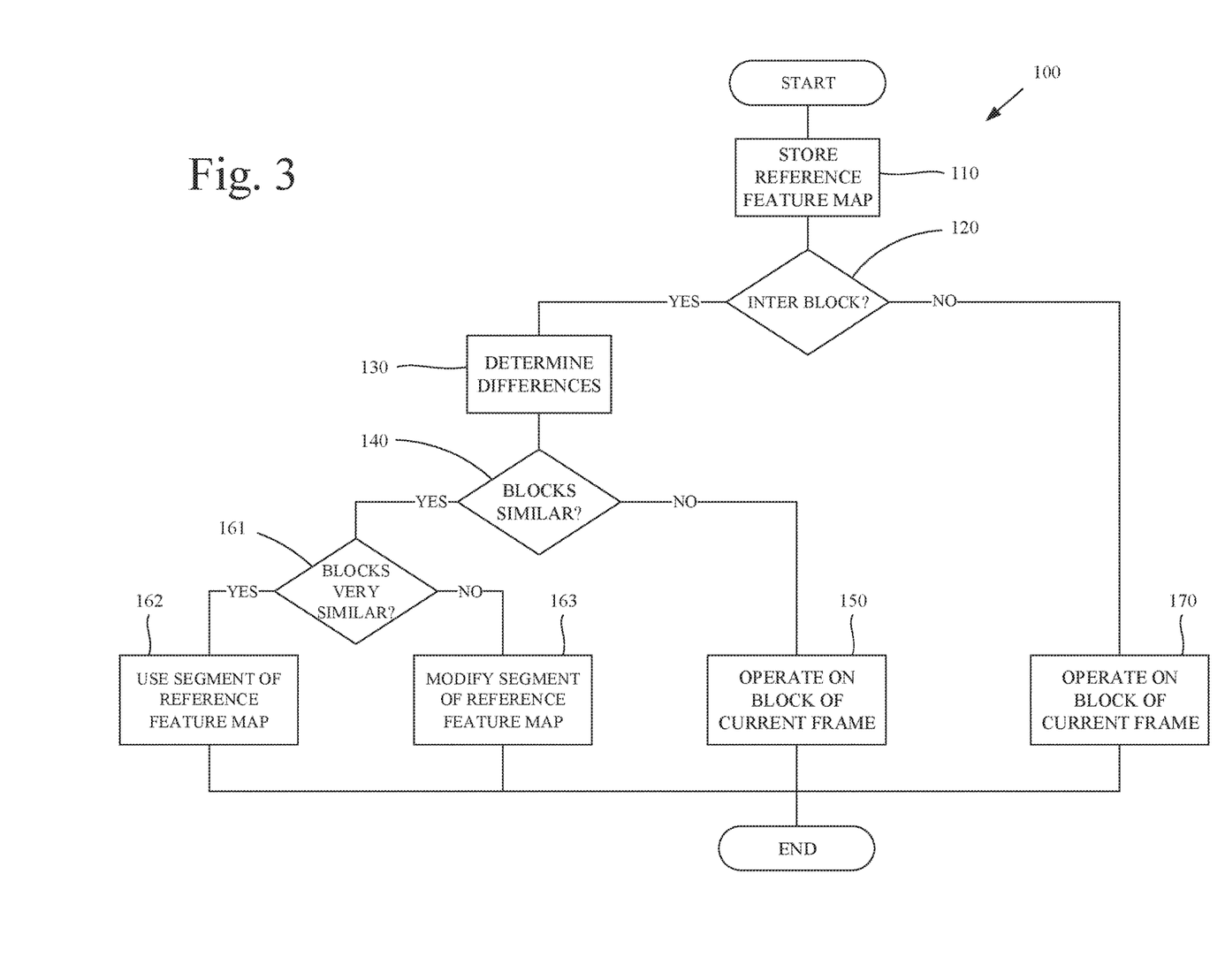
FIG. 3 is a flow chart of a further example of a method for performing operations of a neural network on a video frame.

Referring now to FIG. 3, the second process of the method of FIG. 1 (i.e. the step of using 160 the reference segment to generate the segment of the current feature map) may comprise determining 161 whether the current block and the reference block are very similar (i.e. identical or differing in relatively minor details). For example, the second process may determine that the blocks are very similar in the event that the skip flag is set. Additionally or alternatively, the second process may determine that the blocks are very similar by comparing the measure (e.g. sum of squares of the coefficients) against a further threshold. More particularly, the second process may determine that the blocks are very similar in the event that the measure is less than the further threshold.

In the event that the blocks are very similar, the second process comprises using 162 the reference segment as the segment of the current feature map. However, in the event that the blocks are not very similar, the second process comprises modifying 163 the reference segment, and then using the modified reference segment as the segment of the current feature map.

Figure 4:
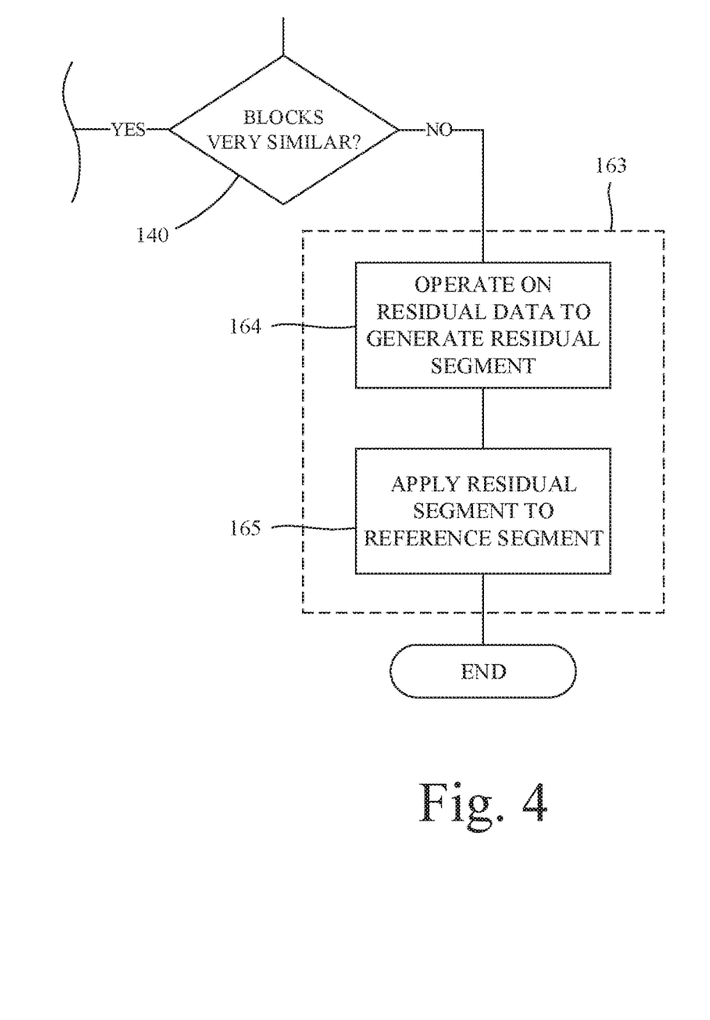
FIG. 4 is a first example method for modifying a segment of a reference feature map.

FIG. 4 is a first example method for modifying 163 the reference segment. The method comprises performing 164 the operation of the neural network (again the same operation(s) as that used to generate the reference feature map) on the residual data of the current block to generate a residual segment, and then applying (e.g. adding) the residual segment to the reference segment to generate the modified segment. By operating on the residual data rather than the pixel data of the current block, the values processed are likely to be smaller and thus a reduction in the amount of toggling in the data-path may be achieved. As a result, the power required to generate the segment of the current feature map may be reduced. Additionally, many of the residual values of the current block are likely to be zero. As a result, the computation required to generate the segment of the current feature map may be better optimized, e.g. by using sparse optimization.

Figure 5:
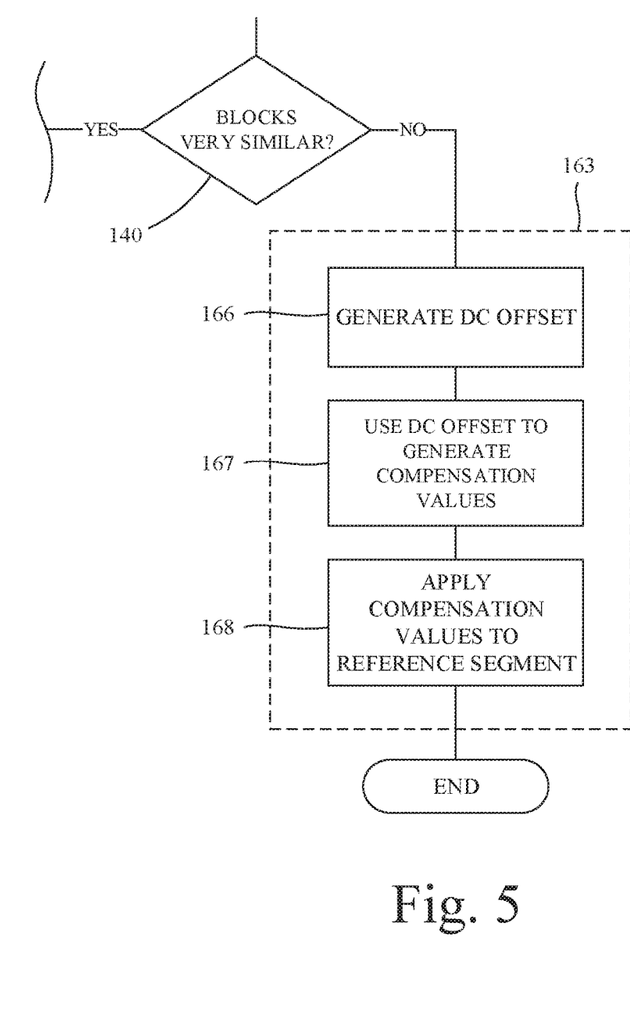
FIG. 5 is a second example method for modifying a segment of a reference feature map.

FIG. 5 is a second example method for modifying 163 the reference segment. Where the current block comprise frequency coefficients, the DC coefficient may be used to modify the reference segment. For a block that has been determined to be similar to its reference block, it is possible that all frequency coefficients, with the exception of the DC coefficient, are zero or are relatively small. Indeed, this may be made a requirement when determining that the two blocks are similar. As noted above, when determining 130 the measure of differences between the current block and the reference block, the measure may comprise more than one determiner. The method may therefore determine that the two blocks are similar if, for example, the sum of squares of the frequency coefficients is less than a threshold and each frequency coefficient is less than a further threshold.

Modifying 163 the reference segment comprises generating 166 a DC offset by performing an inverse frequency transform on the DC coefficient. The DC offset is then used to modify the reference segment to generate the modified segment. The method may comprise using 167 the DC offset to generate one or more compensation values, and applying 168 (e.g. adding) the compensation values to the elements of the reference segment to generate the modified segment. Where the operation comprises a convolution operation, the method may comprise using the DC offset to generate a compensation value for each kernel of the convolution, and applying the compensation value to each element of a respective channel of the segment of the reference feature map to generate the modified segment. The compensation value for each kernel may be generated by multiplying the DC offset with a sum of weights of the kernel. So, for example, a DC offset of 5 and a 3×3 kernel having the weights {0,1,2;0,2,0;2,1,0} would result in a compensation value of 40. Since convolution operations are linear, the compensation value may be applied to the output of the convolution operation in order to achieve the same result as that which would be achieved had the DC offset been applied to the input. However, by applying the compensation value to the output (i.e. the segment of the reference map) rather than the input (i.e. the pixel data of the current block), the need to perform the convolution is avoided and thus the segment of the current feature map may be generated in a computational simpler manner. Moreover, for a trained neural network, the sum of the weights for each kernel may be precalculated and stored, thus further simplifying the computation.

When determining if the two blocks are similar, the DC coefficient may be omitted from the measure, i.e. the measure of differences may be based on the AC coefficients only. As already noted, the DC coefficient corresponds to a DC offset in the spatial domain that is applied to all pixels of the current block. As a result, the DC offset comprises no features. If the DC coefficient were included in the measure of differences (e.g. the sum of squares of the frequency coefficients) and the DC coefficient was relatively large, the method may determine that the current block and the reference block are dissimilar even if the other frequency coefficients were all zero. However, by omitting the DC coefficient from the measure of differences, the method may determine that the current block and reference block are similar and instead use the method of FIG. 5 to generate the segment of the current feature map in a computational simpler way.

FIGS. 4 and 5 show two examples for modifying the segment of the reference feature map. Common to both is the notion that the reference block is modified using the block of the current frame. The two examples are not mutually exclusive, which is to say that the inclusion of one example does not preclude the inclusion of the other example. The method may use one of the two examples based on the measure of differences or some other metric. For example, the method may compare the measure of differences against a third threshold, modify the reference segment using the second example (FIG. 5) in the event that the measure is less than the third threshold, and modify the reference segment using the first example (FIG. 4) in the event that the measure is greater than the third threshold. Alternatively, the method may determine the flatness of the block using the sum of squares or absolute sum of the high frequency coefficients of the current block. The method may then modify the reference segment using the second example (FIG. 5) in the event that the block is flat (i.e. the sum is less than a threshold), and modify the reference segment using the first example (FIG. 4) in the event that the block is not flat (i.e. the sum is greater than the threshold). In this way, the comparatively simpler example of FIG. 5 is used to modify the segment of the reference frame only when there appears to be no or little detail (i.e. zero or small high frequency coefficients) in the current block.

Example methods have thus far been described for generating segments of the current feature map from inter blocks. However, as will now be described with reference to FIG. 6, it is also possible to provide computational benefits in connection with intra blocks of the video frame.

Figure 6:
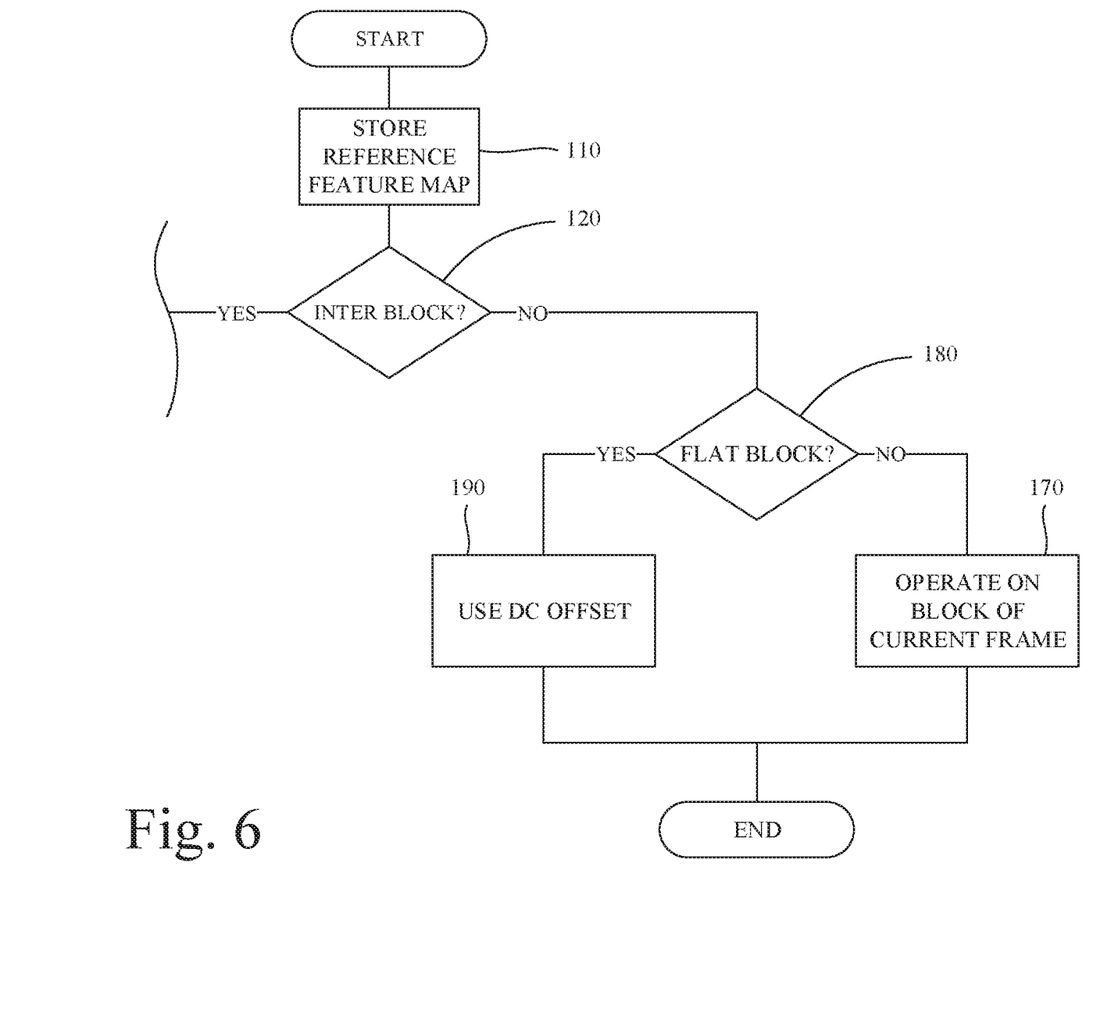
FIG. 6 is a flow chart of a still further example for performing operations of a neural network on a video frame.

FIG. 6 illustrates a modification to the method of FIG. 1. The intra block process method determines 180 if the block is flat. A flat block is one in which the pixel data is generally uniform and is therefore devoid of any features. In intra prediction, a large block generally suggests that the block is flat. Accordingly, the intra block process may determine that block is flat based on the size of the block. For example, the process may determine that the block is flat if the size of the block is greater than 32×32 or some other threshold. The quantization applied to the coefficients of the block may also be an indicator of the flatness of the block. Accordingly, the intra block process may additionally or alternatively determine that the block is flat based on the quantization that is used. The flatness of the block may also be determined from the amplitudes of the high frequency coefficients of the block. For example, the intra block process may comprise determining the sum of squares or absolute sum of the high frequency coefficients of the block, and then determining that the block is flat if the sum is less than a threshold.

In the event that the block is not flat, the intra block process performs 170 the operation of the neural network on the pixel data of the block to generate the segment of the current feature map.

In the event that the block is flat, the intra block process uses 190 the DC offset to generate the segment of the current feature map. More particularly, the intra block process performs an inverse frequency transform on the DC coefficient of the block in order to generate the DC offset. The DC offset is then used to generate each element of the segment of the current feature map. Where the operation comprises a convolution operation, the process may comprise using the DC offset to generate an activation value for each kernel. The activation value may be generated by multiplying the DC offset with a sum of weights of the kernel. The activation value is then used for all elements of a respective channel of the segment of the current feature map. So, for example, if the activation value for the first kernel is 40 and the activation for the second kernel is 25 then all elements of the first channel of the segment will be 40, and all elements of the second channel will be 25.

By identifying intra blocks that are flat and then using the DC coefficient to generate activation values for all elements of the segment of the current feature map, the feature map may be generated in a computational simpler way. As noted above, for a trained neural network, the sum of the weights for each kernel may be precalculated and stored, thus further simplifying the computation.

Example methods have thus far been described in which a reference feature map is stored and used when processing inter blocks of the current frame. The reference feature map is not, however, used when processing intra blocks of the current frame. Accordingly, when processing only intra blocks, there is no requirement to store a reference feature map. Additionally, whilst the methods described thus far store a single reference feature map, the method may comprise storing more than one reference feature map for use in processing inter blocks. For example, the method may comprise storing a first reference feature map that corresponds to the output of the first convolution operation of FIG. 2, and a second reference feature map that corresponds to the output of the first pooling operation of FIG. 2. In the event that the method determines 161 that the current block and the reference block are very similar, the method may use 162 a segment of the second reference feature map as the segment of the current feature map. However, in the event that the method determines 161 that the blocks are not very similar, the method may modify 163 a segment of the first reference feature map, perform the subsequent activation and pooling operations of the neural network on the modified segment of the second reference feature map, and then use the result as the segment of the current feature map.

Figure 7:
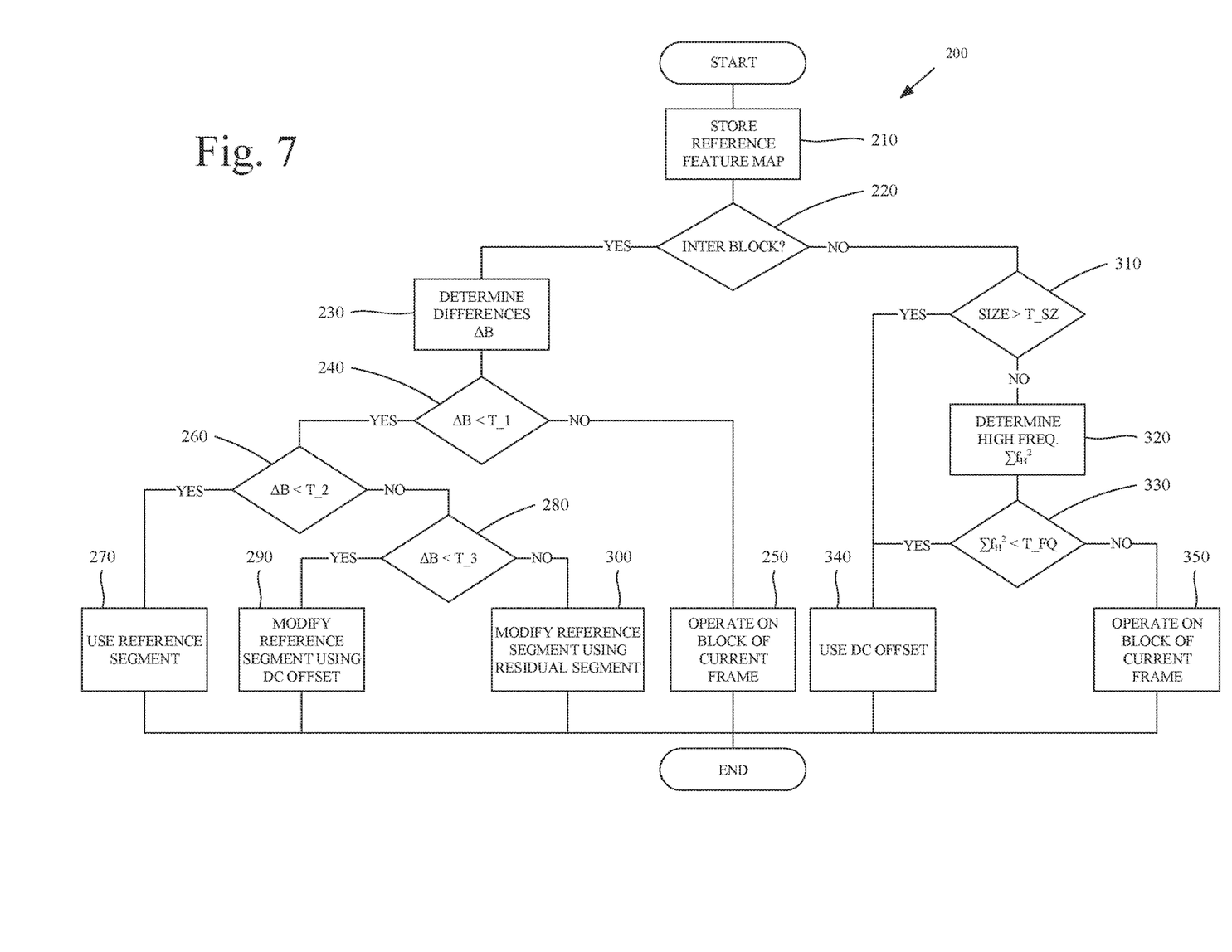
FIG. 7 is a flow chart of another example method for performing operations of a neural network on a video frame.

FIG. 7 is a flow chart of an example method that includes many of the examples described above. The method 200 determines 220 whether a block of the current frame is an inter block or an intra block.

In the event that the block is an inter block, the method determines the similarity of the block with its respective reference block. More particularly, the method determines 230 a measure of the differences, AB, between the two blocks by determining the sum of squares of the frequency coefficients of the block of the current frame. The method then compares 240 the measure, AB, against a first threshold, T_1. If the measure is less than the first threshold, the block is deemed to be similar to the reference block, otherwise the block is deemed to be dissimilar. If the block is deemed to be dissimilar, the method performs 250 the operation of the neural network on the pixel data of the current block to generate the segment of the current feature map. If, on the other hand, the block is deemed similar, the method compares 260 the measure, AB, against a second threshold, T_2. If the measure is less than the second threshold, the block is deemed to be very similar to the reference block and the method uses 270 the reference segment as the segment of the current feature map. Otherwise, the method compares 280 the measure, AB, against a third threshold, T_3. If the measure is less than the third threshold, the method modifies 290 the reference segment using the DC offset in order to generate a modified reference segment, which is then used as the segment of the current feature map. If, on the other hand, the measure is greater than the third threshold, the method performs the operation of the neural network on the residual data of the current block to generate a residual segment. The reference segment is then modified 300 using the residual segment, and the resulting modified segment is then used as the segment of the current feature map.

In the event that the block is an intra block, the method determines the flatness of the block by first comparing 310 the size of the block against a threshold, T_SZ. If the size of the block is greater than the threshold, the block is deemed to be flat. Otherwise, the method determines 320 the sum of squares of the high frequency coefficients, $\Sigma f_H^2$, and compares 330 this against a threshold, T_FQ. If the sum of squares is greater than the threshold, the block is deemed to be flat otherwise the block is deemed to be not flat. If the block is deemed to be flat, the method uses 340 the DC offset to generate each element of the segment of the current feature map. If, on the other hand, the block is deemed to be not flat, the method performs 350 the operation of the neural network on the pixel data of the block to generate the segment of the current feature map.

Figure 8:
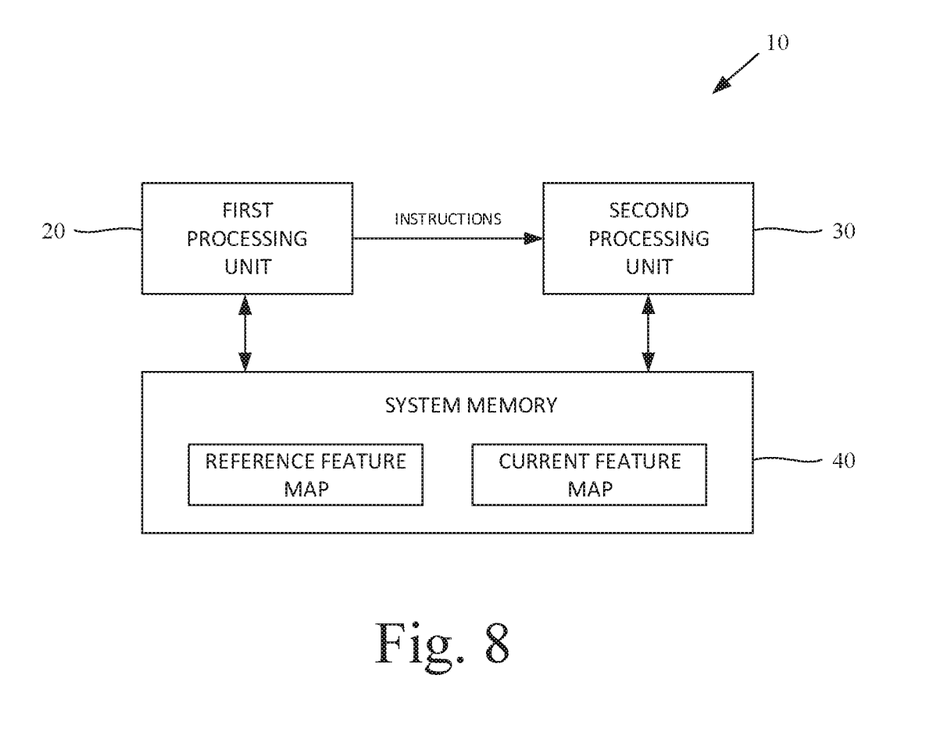
FIG. 8 is a block diagram of a machine learning system.

FIG. 8 shows an example of a machine learning system for implementing one or more of the methods described above. The system 10 comprises a first processing unit 20, a second processing unit 30, and a system memory 40. The first processing unit may be a central processing unit (CPU) and the second processing unit 30 may be a neural processing unit (NPU).

The system memory stores the video (in whole or in part), as well as the reference feature map and the current feature map. The first processing unit 20 is responsible for performing the majority of the steps of the methods described above. However, the second processing unit is responsible for performing any operations of the neural network. Accordingly, whenever the method calls for an operation to be performed on the current block (be it pixel data or residual data), the first processing unit 20 outputs an instruction to the second processing unit 30. The instruction may comprise the type of operation to be performed, the locations in the system memory 40 of the input data (e.g. pixel data or residual data) and the output data (e.g. the segment or the residual segment) and, where applicable, the weights, along with other parameters relating to the operation, such as the number of kernels, kernel size, stride and/or padding. Employing a second processing unit to perform the operations of the neural network has the advantage that the system can take advantage of parallel processing. In particular, the second processing unit may perform the operations of the neural network whilst the first processing unit is analyzing the frames of the video. Additionally, the two processing units may be optimized for their specific tasks and workloads. Nevertheless, the first processing unit could conceivably perform the operations of the neural network, thus obviating the need for a second processing unit.

The methods described above may be used to reduce the computation necessary to generate a feature map of a video frame. The methods exploit the work previously performed by the encoder when computing differences between blocks of adjacent frames. In particular, the methods make use of the differences in order to determine if a segment of a previously-generated feature map (i.e. the reference feature map) may be reused. The methods described above are suitable for use with existing video formats. However, further efficiencies may be made by making changes at the encoder. For example, the encoder may be configured to generate overlapping blocks, and the degree of overlap may be defined by the receptive field and stride length of the filter of the neural network operation. As a result, a feature map may be generated without any gaps or missing data around the segments. Additionally, the encoder may determine if a block and its reference block are very similar, similar or dissimilar (as employed in the methods above). The encoder may then set a flag within the macroblock to indicate whether a block is very similar, similar or dissimilar to its reference block.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
operating on a frame of a video to generate a feature map of a neural network, wherein the frame comprises a plurality of blocks and operating on the frame comprises:
determining if a block of the frame is an inter block or an intra block; and
performing an inter block process in the event that the block is an inter block or an intra block process in the event that the block is an intra block,
wherein the inter block process comprises:
determining a measure of differences between the block of the frame and a reference block of a reference frame of the video; and
performing one of a first process and a second process based on the measure of differences, wherein:
the first process comprises performing at least one operation of the neural network on the block of the frame to generate a segment of the feature map; and
the second process comprises using a segment of a reference feature map to generate the segment of the feature map; and
wherein the intra block process comprises:
determining a measure of flatness of the block; and
performing one of the third process and a fourth process based on the measure of flatness, wherein:
the third process comprises performing at least one operation of the neural network on the block to generate a segment of the feature map; and
the fourth process comprises performing an inverse frequency transform on a DC coefficient of the block to generate a DC offset, and using the DC offset to generate each element of the segment of the feature map.

2. A method as claimed in claim 1, wherein the block of the frame comprises frequency coefficients, and the measure of differences comprises a sum of squares of the frequency coefficients or a sum of absolute values of the frequency coefficients.

3. A method as claimed in claim 1, wherein the method comprises performing the first process in the event that the measure of differences is greater than a first threshold and performing the second process in the event that the measure of differences is less than the first threshold.

4. A method as claimed in claim 1, wherein the block of the frame comprises a motion vector, and the second process comprises using the motion vector to identify or generate the segment of the reference feature map.

5. A method as claimed in claim 1, wherein the segment of the reference feature map is at a fractionally translated position within the reference feature map, and the second process comprises using interpolation in order to generate the segment of the reference feature map.

6. A method as claimed in claim 1, wherein the second process comprises:
comparing the measure of differences against a second threshold;
in the event that the measure of differences is less than the second threshold, using the segment of the reference feature map as the segment of the feature map; and
in the event that the measure of differences is greater than the second threshold, modifying the segment of the reference feature map to generate a modified segment and using the modified segment as the segment of the feature map.

7. A method as claimed in claim 6, wherein modifying the segment of the reference feature map comprises using the block of the frame to modify the segment of the reference feature map to generate the modified segment.

8. A method as claimed in claim 6, wherein modifying the segment of the reference feature map comprises performing the operation on residual data of the block of the frame to generate a residual segment, and applying the residual segment to the segment of the reference feature map to generate the modified segment.

9. A method as claimed in claim 6, wherein the block of the frame comprises frequency coefficients, the frequency coefficients comprise a DC coefficient, and modifying the segment of the reference feature map comprises performing an inverse frequency transform on the DC coefficient to generate a DC offset, and using the DC offset to modify the segment of the reference feature map.

10. A method as claimed in claim 9, wherein using the DC offset to modify the segment of the reference feature map comprises using the DC offset to generate one or more compensation values and applying the compensation values to elements of the segment of the reference feature map to generate the modified segment.

11. A method as claimed in claim 10, wherein the operation of the neural network comprises a convolution operation and using the DC offset to modify the segment of the reference feature map comprises using the DC offset to generate a compensation value for each kernel of the convolution operation, and applying the compensation value to each element of a respective channel of the segment of the reference feature map to generate the modified segment.

12. A method as claimed in claim 11, wherein using the DC offset to generate a compensation value for each kernel comprises multiplying the DC offset with a sum of weights of the kernel.

13. A method as claimed in claim 6, wherein modifying the segment of the reference feature map comprises:
   determining a measure of flatness of the block of the frame, and
   based on the measure of flatness, modifying the segment of the reference feature map using one of a first modification process and a second modification process.

14. A method as claimed in claim 13, wherein:
   the first modification process comprises performing the operation on residual data of the block of the frame to generate a residual segment, and using the residual segment to modify the segment of the reference feature map to generate the modified segment; and
   the second modification process comprises performing an inverse frequency transform on a DC coefficient of the block of the frame to generate a DC offset, and using the DC offset to modify the segment of the reference feature map.

15. A method as claimed in claim 1, wherein determining the measure of flatness comprises determining at least one of a size of the block and a measure of high frequency coefficients of the block.

16. A method as claimed in claim 15, wherein the operation is a convolution operation, and using the DC offset to generate each element comprises multiplying the DC offset with a sum of weights for each kernel of the convolution operation to generate each element of a respective channel of the segment of the feature map.

17. A processing unit configured to:
   determine if a block of a frame of a video is an inter block or an intra block; and
   perform an inter block process in the event that the block is an inter block or an intra block process in the event that the block is an intra block,
   wherein the inter block process comprises:
      determining a measure of differences between the block of the frame and a reference block of a reference frame of the video; and
      performing one of a first process and a second process based on the measure of differences, wherein:
      the first process comprises performing or instructing a further processing unit to perform at least one operation of a neural network on the block of the frame to generate a segment of the feature map; and
      the second process comprises using a segment of a reference feature map to generate the segment of the feature map; and
   wherein the intra block process comprises:
      determining a measure of flatness of the block; and
      performing one of the third process and a fourth process based on the measure of flatness, wherein:
      the third process comprises performing or instructing a further processing unit to perform at least one operation of a neural network on the block to generate a segment of the feature map; and
      the fourth process comprises performing an inverse frequency transform on a DC coefficient of the block to generate a DC offset, and using the DC offset to generate each element of the segment of the feature map.

18. A system comprising a first processing unit and a second processing unit, wherein the first processing unit is configured to:
   operate on a frame of a video to generate a feature map of a neural network, wherein the frame comprises a plurality of blocks and operating on the frame comprises:
      determining if a block of a frame of a video is an inter block or an intra block; and
      performing an inter block process in the event that the block is an inter block or an intra block process in the event that the block is an intra block,
   wherein the inter block process comprises:
      determining a measure of differences between the block of the frame and a reference block of a reference frame of the video; and
      performing one of a first process and a second process based on the measure of differences, wherein:
      the first process comprises instructing the second processing unit to perform at least one operation of the neural network on the block of the frame to generate a segment of the feature map; and
      the second process comprises using a segment of a reference feature map to generate the segment of the feature map; and
   wherein the intra block process comprises:
      determining a measure of flatness of the block; and
      performing one of the third process and a fourth process based on the measure of flatness, wherein:
      the third process comprises performing or instructing the second processing unit to perform at least one operation of the neural network on the block to generate a segment of the feature map; and
      the fourth process comprises performing an inverse frequency transform on a DC coefficient of the block to generate a DC offset, and using the DC offset to generate each element of the segment of the feature map.

* * * * *